United States Patent
Schnatterer et al.

(10) Patent No.: US 12,398,771 B2
(45) Date of Patent: Aug. 26, 2025

(54) FRICTION BRAKE BODY, FRICTION BRAKE, AND METHOD FOR PRODUCING A FRICTION BRAKE BODY

(71) Applicants: Robert Bosch GmbH, Stuttgart (DE); Breyden GmbH, Breidenbach (DE)

(72) Inventors: Christian Schnatterer, Oberursel (DE); Kangjian Wu, Marburg (DE); Ilja Potapenko, Biedenkopf (DE); Thomas Pfeiffer, Steffenberg (DE)

(73) Assignees: Robert Bosch GmbH, Stuttgart (DE); Breyden GmbH, Breidenbach (DE)

( * ) Notice: Subject to any disclaimer, the term of this patent is extended or adjusted under 35 U.S.C. 154(b) by 336 days.

(21) Appl. No.: 18/001,206

(22) PCT Filed: Jun. 10, 2021

(86) PCT No.: PCT/EP2021/065552
§ 371 (c)(1),
(2) Date: Dec. 8, 2022

(87) PCT Pub. No.: WO2021/254857
PCT Pub. Date: Dec. 23, 2021

(65) Prior Publication Data
US 2023/0228308 A1    Jul. 20, 2023

(30) Foreign Application Priority Data
Jun. 15, 2020 (DE) .................. 10 2020 207 361.9

(51) Int. Cl.
*F16D 65/12* (2006.01)
*F16D 69/02* (2006.01)
(Continued)

(52) U.S. Cl.
CPC ......... *F16D 65/127* (2013.01); *F16D 69/027* (2013.01); *F16D 2065/132* (2013.01);
(Continued)

(58) Field of Classification Search
CPC ......... F16D 65/125–128; F16D 69/027; F16D 2065/132; F16D 2069/005; F16D 2069/009
(Continued)

(56) References Cited

U.S. PATENT DOCUMENTS

| | | | |
|---|---|---|---|
| 8,877,296 B2 * | 11/2014 | Lembach | F16D 65/127 427/451 |
| 2007/0286961 A1 * | 12/2007 | Pahle | C23C 4/02 188/218 XL |

(Continued)

FOREIGN PATENT DOCUMENTS

| CN | 101568664 A | 10/2009 |
|---|---|---|
| CN | 102308112 A | 1/2012 |

(Continued)

OTHER PUBLICATIONS

International Search Report corresponding to PCT Application No. PCT/EP2021/065552, mailed Aug. 27, 2021 (German and English language document) (5 pages).

*Primary Examiner* — Christopher P Schwartz
(74) *Attorney, Agent, or Firm* — Maginot, Moore & Beck LLP

(57) ABSTRACT

A friction brake body, in particular a brake disc, for a friction brake of a motor vehicle is disclosed. The friction brake body has a main part with at least one wear protection layer on at least one frictional contact region of the main part. The wear protection layer forms a frictional contact surface on the wear protection layer face facing away from the main part. The degree of hardness of the wear protection layer increases incrementally or continuously from the main part to the frictional contact surface.

11 Claims, 1 Drawing Sheet

(51) Int. Cl.
*F16D 65/02* (2006.01)
*F16D 69/00* (2006.01)

(52) U.S. Cl.
CPC .. *F16D 2069/005* (2013.01); *F16D 2069/009* (2013.01); *F16D 2200/0013* (2013.01)

(58) Field of Classification Search
USPC .................................................. 188/218 XL
See application file for complete search history.

(56) References Cited

U.S. PATENT DOCUMENTS

| | | | |
|---|---|---|---|
| 2010/0012228 | A1 | 1/2010 | Seguchi |
| 2011/0293849 | A1 | 12/2011 | Lembach et al. |
| 2017/0122392 | A1* | 5/2017 | Lembach ................ F16D 69/04 |
| 2020/0072307 | A1* | 3/2020 | Rettig .................. C23C 28/021 |
| 2020/0182318 | A1 | 6/2020 | Kang et al. |

FOREIGN PATENT DOCUMENTS

| | | | | |
|---|---|---|---|---|
| CN | 103154559 A | | 6/2013 | |
| CN | 106415048 A | | 2/2017 | |
| CN | 108026993 A | | 5/2018 | |
| CN | 110925339 A | | 3/2020 | |
| DE | 10342743 A1 | | 4/2005 | |
| DE | 10 2004 052 673 A1 | | 5/2006 | |
| DE | 10 2005 008 569 A1 | | 10/2006 | |
| DE | 10 2007 020 891 A1 | | 11/2008 | |
| DE | 10 2009 008 114 A1 | | 8/2010 | |
| DE | 10 2010 048 075 A1 | | 4/2012 | |
| DE | 102014015474 A1 * | | 4/2016 | ........... C23C 28/042 |
| DE | 10 2019 212 844 A1 | | 3/2020 | |
| EP | 3 034 902 A1 | | 6/2016 | |
| JP | 2008-162036 A | | 7/2008 | |
| JP | 2015-55315 A | | 3/2015 | |
| KR | 100924275 B1 | | 10/2009 | |

* cited by examiner

FRICTION BRAKE BODY, FRICTION BRAKE, AND METHOD FOR PRODUCING A FRICTION BRAKE BODY

This application is a 35 U.S.C. § 371 National Stage Application of PCT/EP2021/065552, filed on Jun. 10, 2021, which claims the benefit of priority to Serial No. DE 10 2020 207 361.9, filed on Jun. 15, 2020 in Germany, the disclosures of which are incorporated herein by reference in their entirety.

The disclosure relates to a friction brake body, in particular a brake disc, for a friction brake of a motor vehicle, wherein the friction brake body has a main part with at least one wear protection layer on at least one frictional contact region of the main part, wherein the wear protection layer forms a frictional contact surface on the wear protection layer face facing away from the main part.

Furthermore, the disclosure relates to a friction brake for a motor vehicle, comprising at least one friction brake body that is designed as described above, with at least one brake pad that is assigned to the friction brake body and that is arranged in a manner allowing displacement.

Furthermore, the disclosure relates to a method for producing the friction brake body described above.

BACKGROUND

Friction brake bodies for motor vehicles, in particular brake discs for friction brakes, are already known from the prior art. When used as intended, the friction brake body, in particular the brake disc, is connected in a torque-proof manner to a wheel of a motor vehicle and arranged opposite a displaceable brake pad. If the brake pad is pressed against the friction brake body, friction is generated between the friction brake body and the brake pad, by means of which the wheel speed of the wheel is reduced—i.e., the wheel is braked. In order to reduce the wear produced by this friction, it is also known to apply a wear protection layer at least in the frictional contact region of the main part that interacts with the brake pad. During a braking operation, the wear protection layer reduces wear and thereby extends the service life of the friction brake body itself, along with the friction brake overall.

A coated brake disc with which a wear protection layer with embedded ceramic particles is produced by means of laser deposition welding is known from published patent application EP 3 034 902 A1.

SUMMARY

The friction brake body according to the disclosure having the features of claim 1 has the advantage that the crack resistance of the friction brake body is advantageously increased. According to the disclosure, this is achieved in that the degree of hardness of the wear protection layer increases incrementally or continuously from the main part to the frictional contact surface. As a result, the crack resistance of the coating increases from the frictional contact surface to the main part, such that crack propagation into the main part is prevented. This results in a friction brake body that, on the one hand, has a particularly high degree of hardness and thus wear resistance on the frictional contact surface, and at the same time sufficient ductility and crack resistance, which prevents a crack arising on the frictional contact surface from propagating into the main part. As a result, the friction brake body can be exposed to thermo-mechanical stresses, as can occur, for example, during hard braking, without a crack forming in the main part, or forming and propagating into the main part. As a result, the mechanical strength and robustness—in relation to corrosion resistance as well—are increased overall. If a crack occurs, the growth of the crack on the friction brake body according to the disclosure thus takes place preferably along the hard materials, since they reduce the fracture toughness of the wear protection layer as inclusions. However, according to the disclosure, they arise more in the region of the frictional contact surface than in the region of the main part.

According to a preferred refinement of the disclosure, the wear protection layer has a proportion of carbide-forming elements and carbon that increases from the main part to the frictional contact surface. This ensures that the hardness degree of the wear protection layer increases in the direction of the frictional contact surface, as described above.

The carbide-forming elements are introduced into the wear protection layer in particular in a laser deposition welding process. The wear protection layer preferably has an iron-based alloy in which the carbide-forming elements are taken up and optionally fused.

Preferably, vanadium, niobium, titanium and/or chromium are present as carbide-forming elements. During solidification, metal carbides are formed in a fine distribution in the wear protection layer by reaction of the carbide-forming elements with carbon atoms of the base alloy, increasing the degree of layer hardness and thus the wear resistance of the wear protection layer.

Furthermore, it is preferably provided that the carbon content in the wear protection layer increases linearly or degressively from the base substrate to the frictional contact surface. The linear increase has a particularly positive effect on the crack resistance of the wear protection layer. The degressive increase in the carbon concentration is characterized in that the carbon concentration gradient decreases starting from the substrate in the direction of the coating surface. The degressive increase combines the increased crack resistance with the longest possible maintenance of the friction coefficient of the wear protection layer during braking.

Particularly preferably, the wear protection layer has multiple layers, in particular three layers, wherein the degree of hardness increases from layer to layer. In this case, an incremental increase of the degree of hardness and/or an incremental hardening profile of the wear protection layer from the main part to the frictional contact surface is thus ensured. The wear protection layer can in principle have at least two, preferably three, or even more than three layers, which together form the wear protection layer on the main part, wherein the layers lie on top of one another in layers parallel to the main part.

Particularly preferably, the first layer of the wear protection layer arranged on the main part has a carbon content of less than 0.2% by weight, in particular less than 0.1% by weight. The first layer thus serves primarily as a ductile buffer layer without, or with only a low, carbide content and with a low carbon content.

A second layer whose carbon content is higher than that of the first layer, wherein the carbon content is between 0.2% by weight and 1.5% by weight, in particular between 0.1% by weight and 1.0% by weight, is preferably arranged on the first layer. In this case, the second layer constitutes a transition region to the third layer that lies on the face of the second layer facing away from the first layer. As a result of the insertion of the transition layer, not only is the adhesion between the first and the third layer improved, but the thermomechanical stresses in the layer system of the wear protection layer during braking are reduced.

The third layer, which, as already mentioned above, is located or is arranged on the face of the second layer facing away from the first layer, preferably has the highest carbon content of the layers, in particular a carbon content of more than 1.0% by weight. The third layer thus functions as the actual wear protection layer, with the highest degree of layer hardness and wear resistance.

Preferably, the ratio of carbon content and carbide-forming elements is selected such that the carbon atoms are completely, or nearly completely, bound in the carbides. The carbide-forming metal atoms present are preferably formed analogously to the carbon content in the coating, because carbide-forming metal atoms, such as vanadium, titanium, niobium or chromium, are also required for the formation of the metal carbides, in addition to carbon.

Furthermore, it is preferably provided that the carbide-forming elements present have a higher carbon affinity than chromium. This ensures that, in the case of chromium optionally being additionally used in the alloy, which is advantageous for increasing the corrosion resistance of the wear protection layer, chromium does not function as a carbide former, and is thus available for protecting the wear protection layer from corrosion.

The friction brake according to the disclosure is characterized by the embodiment of the friction brake body set forth herein. This results in the advantages already mentioned.

The method according to the disclosure is characterized in that the wear protection layer is produced with a degree of hardness that increases incrementally or continuously from the main part to the frictional contact surface. For this purpose, in particular, the proportion of carbide-forming elements and carbon is increased from the main part to the frictional contact surface. Vanadium, titanium, niobium and/or chromium are used in particular as carbide-forming elements, wherein the carbon content increases linearly or degressively from the base substrate to the frictional contact surface. In particular, the wear protection layer is produced in multiple layers, in particular three layers, with an increasing hardness degree from layer to layer.

BRIEF DESCRIPTION OF THE DRAWINGS

Further advantages and preferred features and combinations of features result in particular from the previously described features and from the claims. The disclosure will be explained in more detail below with reference to the drawings, in which:

DETAILED DESCRIPTION

Figure 1:
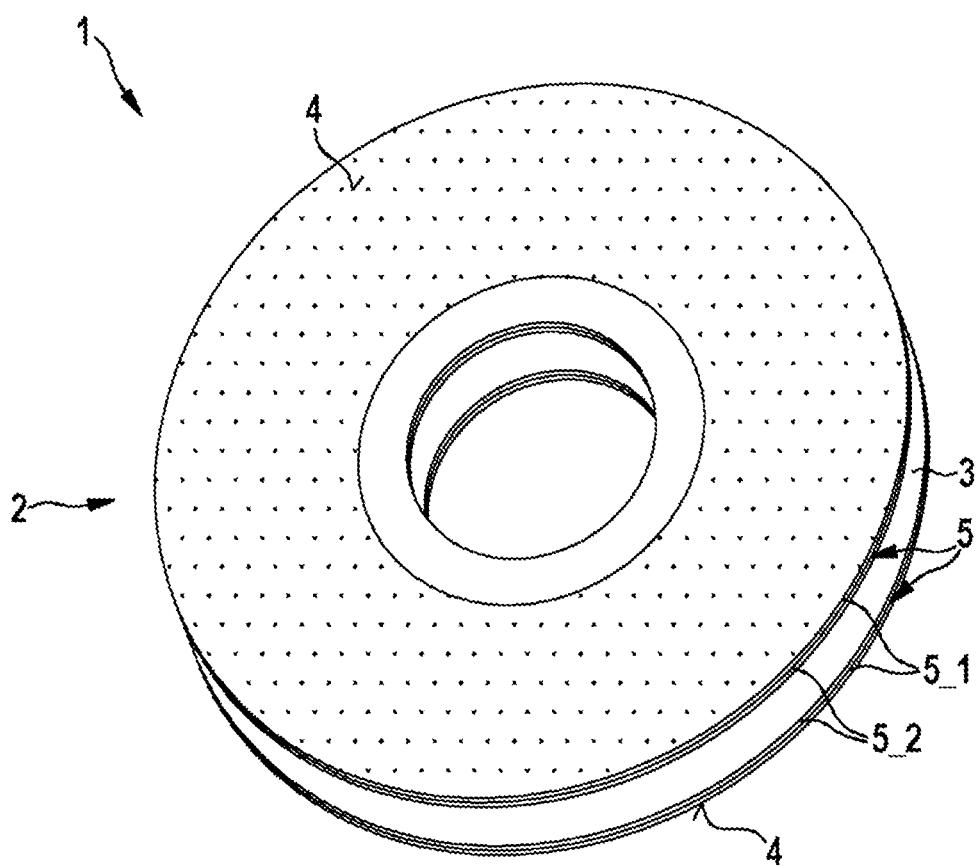
FIG. 1 shows an advantageous friction brake body in a perspective view.

FIG. 1 shows a simplified perspective illustration of a friction brake body designed as a brake disc 1 of a friction brake 2 of a motor vehicle, which is not shown in greater detail here. The brake disc 1 is designed in the shape of a circular ring, and serves to work together with a movable brake pad of the friction brake, which can be pressed against at least one of the end faces of the brake disc 1. An optionally-present brake disc drum is not shown in FIG. 1.

The brake disc 1 has a main part 3 with a circular ring shape, which on both of its end faces has a frictional contact surface 4 that is formed by a wear protection layer 5 on the main part 3. The main part 3 is preferably made of grey cast iron, and the wear protection layer 5 extends at least over a frictional contact surface of both of the end faces of the main part 3. The wear protection layer is produced on the main part 3 by a laser deposition welding method, for example.

The wear protection layer 5 is characterized in that it has a degree of hardness that increases from the main part 3 to the exposed frictional contact surface 4. In particular, the wear protection layer has an incremental or continuous hardening profile in the axial direction and/or in the direction from the main part 3 to the frictional contact surface 4. According to the embodiment of FIG. 1, the wear protection layer 5 is formed in multiple layers, namely two layers, such that the wear protection layer 5 is formed from two layers 5_1 and 5_2, wherein the outer layer 5_1 has a higher degree of hardness than the layer 5_2 positioned between the layer 5_1 and the main part 3. In particular, the different hardness degrees of the two layers 5_1, 5_2 are realized by different proportions of carbide-forming elements and carbon. Due to the fact that the degree of hardness of the wear protection layer increases from the main part 3 to the layer surface on the frictional contact surface 4, an improved crack resistance of the brake disc 1 results. In particular, the advantageous design ensures that crack propagation into the main part 3 is avoided. This is achieved by a graded distribution of carbon and carbide-forming elements, such as vanadium, titanium, niobium or chromium within the wear protection layer 5. During solidification, the reaction of the carbide-forming elements with carbon atoms forms finely distributed metal carbides in the wear protection layer 5, which increase the degree of layer hardness of the given layer 5_1, 5_2 and thus the wear resistance of the wear protection layer 5. The content of carbon and carbide-forming elements increases in the direction of the frictional contact surface 4, wherein, according to the present embodiment of FIG. 1, it increases incrementally from layer 5_2 to layer 5_1. According to an alternative embodiment, the degree of hardness of the wear protection layer 5 and/or the content of carbon and carbide forming elements increases continuously from the main part 3 to the frictional contact surface 4.

The wear protection layer 5 has, in particular, an iron base alloy, the carbon content of which in the wear protection layer 5 gradually increases from the main part to the frictional contact surface 4. This is achieved, for example, by a variation of the coating material. The carbon content in this case preferably increases at least substantially linearly or degressively, wherein a linear increase improves the crack resistance and a degressive increase ensures that the coefficient of friction at the frictional contact surface 4 is maintained as long as possible.

Figure 2:
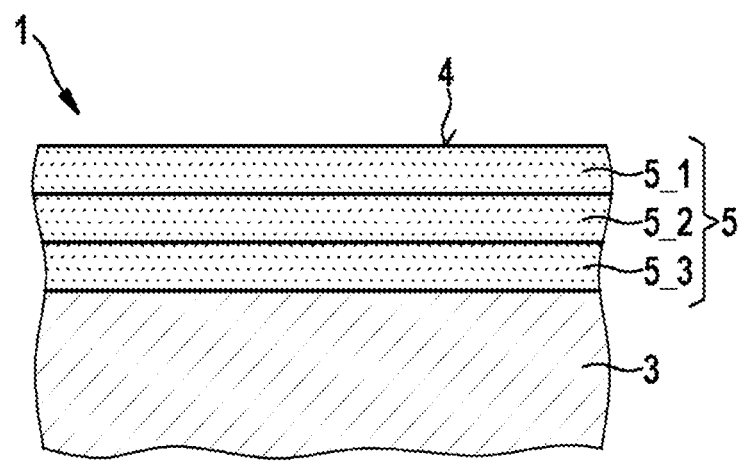
FIG. 2 shows a schematic sectional illustration of the friction brake body to explain the advantageous design of the friction brake body and of an advantageous production method.

FIG. 2 shows a further embodiment of the brake disc 1, wherein, FIG. 2 shows a longitudinal sectional view of a portion of the brake disc 1. In contrast to the preceding embodiment, the wear protection layer 5 here is designed in three layers, wherein a third layer 5_3 is present between the main part 3 and the layer previously denoted as 5_2. The carbon content varies from layer to layer to ensure an incremental increase in the direction of the frictional contact surface 4.

The first layer 5_3 on the main part 3 serves primarily as a ductile buffer layer without, or with only a low, carbide content, and therefore also has only a low carbon content of preferably less than 0.1% by weight.

The second layer 5_2 represents a transition region to the outer layer 5_1, which forms the frictional contact surface 4. The layer 5_2 not only improves the adhesion between the layers 5_1 and 5_3, but also reduces thermomechanical stresses in the layer system when the brake disc 1 is used for braking. For this purpose, the layer 5_2 has a higher carbon content than the first layer 5_3, preferably between 0.1% by weight and 1.0% by weight.

The third layer 5_1 functions as an actual wear protection layer, and therefore forms the frictional contact surface 4. The third layer 5_1 is characterized by the highest carbon content and thus by the highest degree of layer hardness. The carbon content of the layer 5_1 is thus preferably higher than 1.0% by weight.

Since carbide-forming elements such as vanadium, titanium, niobium or chromium are also used for the formation of metal carbides, as already mentioned above, the content of carbide-forming elements is preferably distributed and/or varied analogously to the carbon content in the layers 5_1 to 5_3. Preferably, the ratio of the carbon content and the carbide-forming metal atoms is selected in such a manner that complete binding of the carbon atoms in carbides occurs in each of the layers 5_1 to 5_3. Furthermore, it is preferred that the alloyed carbide-forming metal atoms have a higher carbon affinity than chromium. In this way, in the event that chromium is additionally used in the alloy, which is advantageous for increasing the corrosion resistance of the wear protection layer, chromium does not function as a carbide former, and is thus available for corrosion protection of the wear protection layer 5.

What is claimed is:

1. A friction brake body for a friction brake of a motor vehicle, comprising:
   a main part;
   a first wear protection layer located on the main part and comprising a carbon content of less than 0.1% by weight, a first degree of hardness of the first wear protection layer is greater than a degree of hardness of the main part;
   a second wear protection layer arranged on the first wear protection layer and comprising a carbon content from 0.1% by weight to 1.0% by weight, a second degree of hardness of the second wear protection layer is greater than the first degree of hardness of the first wear protection layer; and
   a third wear protection layer arranged on the second wear protection layer and comprising a carbon content greater 1.0% by weight, a third degree of hardness of the third wear protection layer is greater than the second degree of hardness of the second wear protection layer,
   wherein the third wear protection layer is configured to form a frictional contact surface facing away from the main part.

2. The friction brake body according to claim 1, wherein:
   the first wear protection layer has a first proportion of carbide-forming elements and carbon,
   the second wear protection layer has a second proportion of carbide-forming elements and carbon that is greater than the first proportion, and
   the third wear protection layer has a third proportion of carbide-forming elements and carbon that is greater than the second proportion.

3. The friction brake body according to claim 2, wherein a ratio of the carbide-forming elements and the carbon is selected such that carbon atoms are completely, or nearly completely, bound in carbides formed from the carbide-forming elements.

4. The friction brake body according to claim 2, wherein;
   when chromium is used in an alloy forming the first, second, and third wear protection layers, other carbide-forming elements are included in the alloy, and
   the other carbide-forming elements have a higher carbon affinity than chromium.

5. The friction brake body according to claim 2, wherein vanadium, niobium, tungsten, titanium and/or chromium are the carbide-forming elements.

6. A friction brake for a motor vehicle, comprising:
   at least one friction brake body according to claim 1; and
   at least one brake pad assigned to the at least one friction brake body, the at least one brake pad displaceable relative to the at least one friction brake body.

7. A method for producing a friction brake body according to claim 1, for a friction brake of a motor vehicle, comprising:
   producing the friction brake body from a main part having at least one wear protection layer on at least one frictional contact region of the main part, in such a way that the at least one wear protection layer forms a frictional contact surface on the wear protection layer facing away from the main part,
   wherein the at least one wear protection layer is produced with a degree of hardness that increases incrementally or continuously from the main part to the frictional contact surface.

8. The friction brake body according to claim 1, wherein the friction brake body is a brake disc.

9. The friction brake body according to claim 1, wherein the first wear protection layer is a ductile buffer layer.

10. The friction brake body according to claim 1, wherein the second wear protection layer is configured to reduce thermomechanical stresses in the first wear protection layer and the third wear protection layer.

11. The friction brake body according to claim 1, wherein the carbon content in the first, second, and third wear protection layers increases degressively from the main part to the frictional contact surface.

* * * * *